(12) United States Patent
Ho et al.

(10) Patent No.: US 8,806,531 B1
(45) Date of Patent: Aug. 12, 2014

(54) DYNAMIC POPULARITY-BASED ADVERTISEMENT SELECTION FOR VIDEO ON DEMAND

(75) Inventors: Chi Fai Ho, Palo Alto, CA (US); Shin Cheung Simon Chiu, Palo Alto, CA (US); John Chiong, San Jose, CA (US)

(73) Assignee: TP Lab, Inc., Palo Alto, CA (US)

( * ) Notice: Subject to any disclaimer, the term of this patent is extended or adjusted under 35 U.S.C. 154(b) by 1217 days.

(21) Appl. No.: 11/701,291

(22) Filed: Jan. 31, 2007

(51) Int. Cl.
*H04N 7/10* (2006.01)
*H04N 7/025* (2006.01)

(52) U.S. Cl.
USPC ............................................................ 725/35

(58) Field of Classification Search
CPC .............. H04N 21/25841; H04N 21/4524; H04N 21/23424; H04N 21/26241; H04N 21/4316; H04N 21/4331; H04N 21/454; H04N 21/458; H04N 21/812; H04N 21/25825; H04N 21/4126; H04N 21/414; H04N 21/41407; H04N 21/4222; H04N 21/4621; H04N 21/6131; H04N 21/6181
USPC ............... 725/9, 32, 35, 14, 34, 1, 42, 86, 91, 725/110, 105; 705/51; 380/240, 20; 707/10; 455/442
See application file for complete search history.

(56) References Cited

U.S. PATENT DOCUMENTS

| | | | | |
|---|---|---|---|---|
| 5,621,793 | A * | 4/1997 | Bednarek et al. | 380/240 |
| 6,976,010 | B2 * | 12/2005 | Banerjee et al. | 705/51 |
| 2002/0078441 | A1 * | 6/2002 | Drake et al. | 725/9 |
| 2002/0144262 | A1 * | 10/2002 | Plotnick et al. | 725/32 |
| 2003/0074672 | A1 * | 4/2003 | Daniels | 725/110 |
| 2003/0097664 | A1 * | 5/2003 | Meyers et al. | 725/138 |
| 2003/0196206 | A1 * | 10/2003 | Shusman | 725/91 |
| 2003/0226142 | A1 * | 12/2003 | Rand | 725/32 |
| 2004/0030599 | A1 * | 2/2004 | Sie et al. | 705/14 |
| 2005/0066371 | A1 * | 3/2005 | Lu | 725/105 |
| 2006/0116127 | A1 * | 6/2006 | Wilhoite et al. | 455/442 |
| 2006/0136549 | A1 * | 6/2006 | Carro | 709/203 |
| 2006/0248209 | A1 * | 11/2006 | Chiu et al. | 709/231 |
| 2006/0253458 | A1 * | 11/2006 | Dixon et al. | 707/10 |
| 2006/0287916 | A1 * | 12/2006 | Starr et al. | 705/14 |
| 2007/0094042 | A1 * | 4/2007 | Ramer et al. | 705/1 |
| 2008/0155588 | A1 * | 6/2008 | Roberts et al. | 725/34 |

* cited by examiner

*Primary Examiner* — Nasser Goodarzi
*Assistant Examiner* — An Nguyen
(74) *Attorney, Agent, or Firm* — North Shore Patents, P.C.; Michele Liu Baillie

(57) ABSTRACT

In a method and system for selecting an advertisement for video on demand, a video player is connected to a video content provider over a network via an access gateway. The video content provider receives a request for a video content from the video player, determines a popularity count for the video content and a geographical area for the video player, selects the advertisement based on the popularity count and the geographical area, and sends the video content combined with the advertisement to the video player. In one embodiment, the advertisement has a corresponding advertisement rule with an advertising condition which specifies a required popularity count and geographical area. If the advertisement condition is satisfied, then the advertisement is selected. In this manner, an advertisement for video on demand is selected based upon both demographics information and location of the video player increasing the effectiveness of the advertisement.

17 Claims, 3 Drawing Sheets

US 8,806,531 B1

DYNAMIC POPULARITY-BASED ADVERTISEMENT SELECTION FOR VIDEO ON DEMAND

BACKGROUND

1. Field

This invention relates to system and method for selecting an advertisement for video on demand.

2. Related Arts

Businesses constantly look for new and more effective ways to advertise their merchandises or services.

With the advent of the Internet, on-line advertising becomes an important venue for businesses. On-line advertisers draw on experience of the traditional advertising channels, including advertising decision based on demographics information. This is particularly attractive to on-line advertising as it is easy to collect demographics information using consumer information, for example, in the form of user inputs or client-side cookies.

With the popularity of viewing video contents over the Internet, attaching an advertisement to a video content is common. However, selecting an effective advertisement for a video content remains a challenge. It is often inadequate to only take into account demographics information or consumer information.

In one example, John uses his personal computer (PC) at his downtown New York apartment to watch a Houston Rocket's basketball game highlight video from a sports web portal. Based on demographics information about the video, the portal attaches an advertisement for an athletic shoe store weekend promotion in Houston, Tex. The athletic shoe store fails to attract John, while having to pay the portal for the advertisement.

In another example, while vacationing at Maui, Hi., Jenny uses her smartphone to view a recorded episode of "Desperate Housewives" from an on-line video site. Based on demographics information about the episode and user information of Jenny, the on-line video site attaches an advertisement for a jewelry store at Palo Alto, Calif. where Jenny resides.

Therefore, there is a need to select an advertisement for video on demand that is based upon both demographics information and location of the viewing device.

SUMMARY

In a method and system for selecting an advertisement for video on demand, a video player is connected to a video content provider over a network via an access gateway. The video content provider receives a request for a video content from the video player, determines a popularity count for the video content and a geographical area for the video player, selects the advertisement based on the popularity count and the geographical area, and sends the video content combined with the advertisement to the video player. In one embodiment, the advertisement has a corresponding advertisement rule with an advertising condition which specifies a required popularity count and geographical area. If the advertisement condition is satisfied, then the advertisement is selected. In this manner, an advertisement for video on demand is selected based upon both demographics information and location of the video player, increasing the effectiveness of the advertisement.

DETAILED DESCRIPTION

Figure 1:
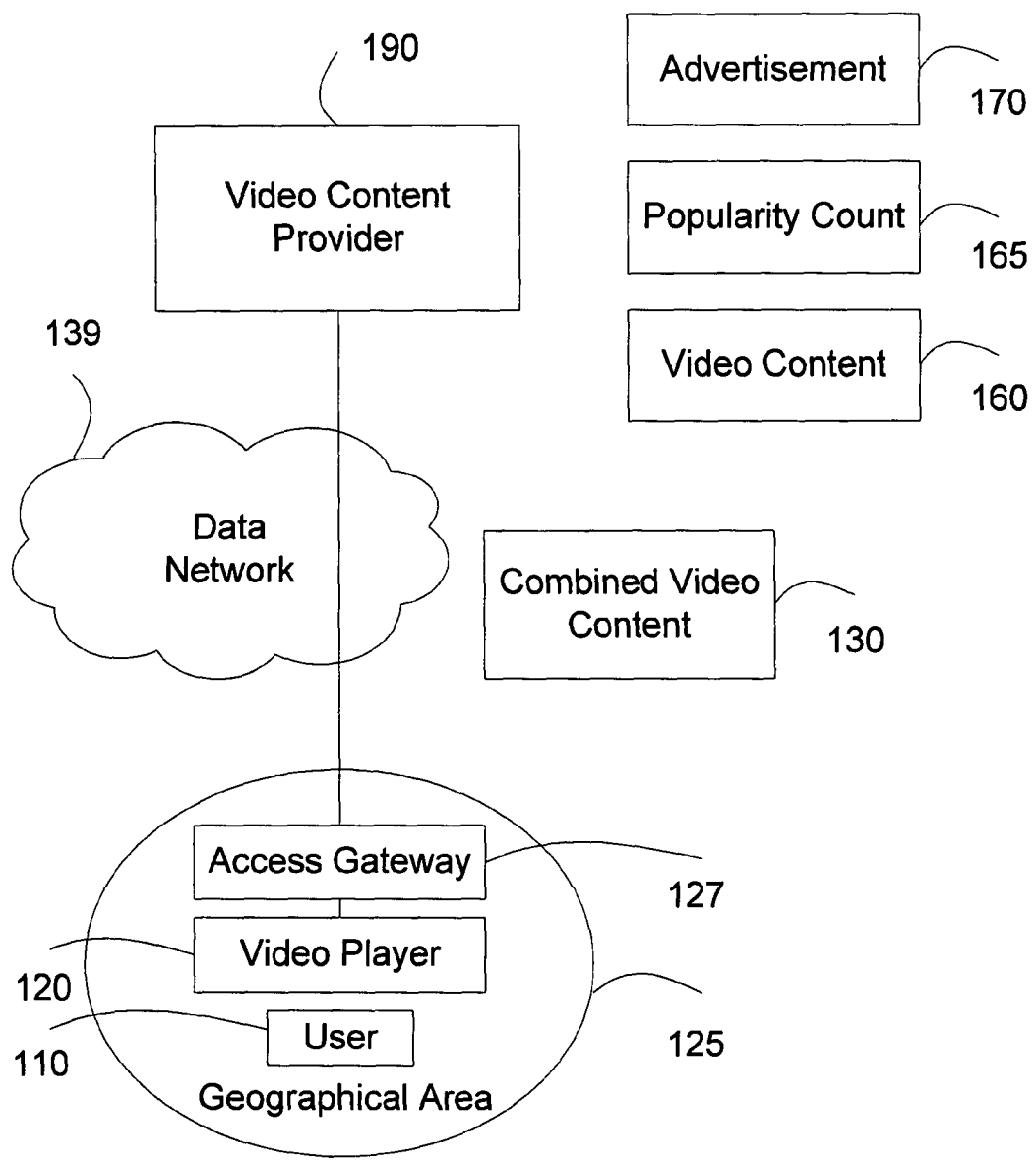
FIG. 1 illustrates a user using a video player to request a video content.

FIG. 1 illustrates a user using a video player to request a video content.

User 110 uses video player 120 located in a geographical area 125 to request a video content 160 from a video content provider 190.

Video content 160 includes video information. In one embodiment, video content 160 is a movie, an animation clip, a video clip, a recorded television program, or a video recording. In one embodiment, video information is encoded in a media digital format such as Moving Picture Experts Group—4 (MPEG-4), Adobe Flash, Windows Media Video (WMV), MPEG-1, MPEG-2, QuickTime file, or Audio Video Interleave (AVI) format.

In one embodiment, video content 160 is a news report, a weather update, a local weather report, a live traffic view or an entertainment story. In one embodiment, video content 160 is a movie, such as a drama, a comic, a romance, or a horror movie. In one embodiment, video content 160 is a documentary, such as a wild life, history, archeology, travel, or sport documentary. In one embodiment, video content 160 is a recorded episode of a television series, such as a sitcom, a crime story, a reality show, a talk show. In one embodiment, video content 160 is a recorded television production such as a sport event, a variety show or a beauty pageant contest. In one embodiment, video content 160 is an instructional video, such as for cooking, sport, bonsai, exercise, weight-loss or home improvement video. In one embodiment, video content 160 is a Music TV™ (MTV) production, or a concert recording. In one embodiment, video content 160 is a short video about arts, pets, music, politics, religion, sports highlights, or people. In one embodiment, video content 160 is a short video about news and Internet blogs.

Video player 120 is a computing device capable of playing video content. In one embodiment, video player 120 includes a personal desktop computer, a personal laptop computer, a hand-held computing device, a video appliance, or a media center. In one embodiment, video player 120 includes a graphical display screen based on technologies such as Thin-Film Transistor (TFT), Plasma Display Panel (PDP) or Liquid Crystal Display (LCD). In one embodiment, video player 120 includes a media output interface, such as an RCA jack, a High-Definition Multimedia Interface (HDMI) jack. In one embodiment, video player 120 includes a Personal Area Network (PAN) interface based on, for example, Bluetooth technology. In one embodiment, video player 120 includes a software program such as a web browser such as Internet Explorer™, Netscape™, Safari™ or Firefox™. In one embodiment, video player 120 includes a browser plugin. In one embodiment, video player 120 includes a standalone media player application such as Adobe™ Flash Player, Microsoft™ Media Player, RealPlayer™, or QuickTime™. In one embodiment, video player 120 is a mobile device. In one embodiment, video player 120 is a smartphone, a Personal Data Assistance (PDA) or an MP4 player.

In one embodiment, geographical area 125 is a metropolitan area such as the San Francisco Bay Area, Washington D.C. Metro Area, or Detroit Mich. In one embodiment, geographical area 125 is a regional division such as the Pacific Coast that includes the states of Oregon, Washington and California, or the Mountain States that includes Arizona, Colorado, Idaho, Montana, Nevada, New Mexico, Utah, and Wyoming. In one embodiment, geographical area 125 is a city, such as New York, Chicago, or San Jose. In one embodiment, geographical area 125 is within a section in a shopping district or a shopping center, such as a street block, courtyard, town square, portion of a street block, several adjacent street blocks, a shopping center section, a court yard, a restaurant, a food court, a department store, a rest area, or a parking lot.

Video player 120 connects to video content provider 190 over a public data network 139. In one embodiment, data network 139 includes the Internet.

In one embodiment, video player 120 accesses data network 139 via an Internet service provider. Video player 120 accesses data network 139 via an access gateway 127 operated by the Internet service provider. Access gateway 127 is located in the geographical area 125. In one embodiment, access gateway 127 is a Digital Subscriber Line Access Multiplexer (DSLAM), a Broadband Remote Access Server (BRAS), a Gateway GPRS Support Node (GGSN), a Cable Modem Termination System (CMTS) or a Cable Data Modem Termination System (CDMTS). In one embodiment, the access gateway is a wireless hotspot access point.

In one embodiment, video content provider 190 is an Internet portal such as Yahoo!™, America Online™ (AOL), or Microsoft Service Network™ (MSN) portal. In one embodiment, video content provider 190 is an Internet portal with journal style content about politics, sports, hobbies or news. In one embodiment, video content provider 190 is a website for social networking or online diaries. In one embodiment, video content provider 190 is a video sharing website such as Yahoo!™ Video, or Google™ Video. In one embodiment, video content provider 190 is an e-commerce website.

Video content provider 190 selects an advertisement 170 based on a popularity count 165, and geographical area 125.

Popularity count 165 indicates the popularity of video content 160. In one embodiment, popularity count 165 includes the number of times video content 160 has previously been requested by video players located within geographical area 125. In one embodiment, popularity count 165 includes the number of times video content 160 has previously been requested by video players located within geographical area 125 during a time period.

In one embodiment, advertisement 170 is for promoting brand recognition such as automobiles, airline service, vacation cruises, hotel chains, food or beverage. In one embodiment, advertisement 170 is for promoting a local business such as an auto service station, a dental office, a real estate broker, a restaurant, a gym, a retail store, or a beauty salon. In one embodiment, advertisement is for personal business that offers music or sports lesson, palm reading, or private instruction.

In one embodiment, advertisement 170 includes video information. Video content provider 190 combines video content 160 and advertisement 170 to generate combined video content 130. In one embodiment, video content provider 190 combines video content 160 and advertisement 170 by inserting advertisement 170 at the beginning, at the end, or within video content 160.

Video content provider 190 delivers combined video content 130 to video player 120. In one embodiment, video content provider 190 sends a Universal Resource Identifier (URI) of combined video content 130 to video player 120. In one embodiment, the URI is based on Real Time Streaming Protocol (RTSP), File Transfer Protocol (FTP), or Hypertext Transfer Protocol (HTTP).

In one embodiment, video player 120 receives a RTSP-based URI for combined video content 130. Video player 120 uses the RTSP-based URI to obtain combined video content 130 streamed from video content provider 190. In one embodiment, video player 120 receives a FTP-based URI for combined video content 130. Video player 120 uses the FTP-based URI to download combined video content 130 from video content provider 190. In one embodiment, video player 120 receives a HTTP-based URI for combined video content 130. Video player 120 uses the HTTP-based URI to obtain combined video content 130.

Video player 120 plays combined video content 130.

Figure 2A:
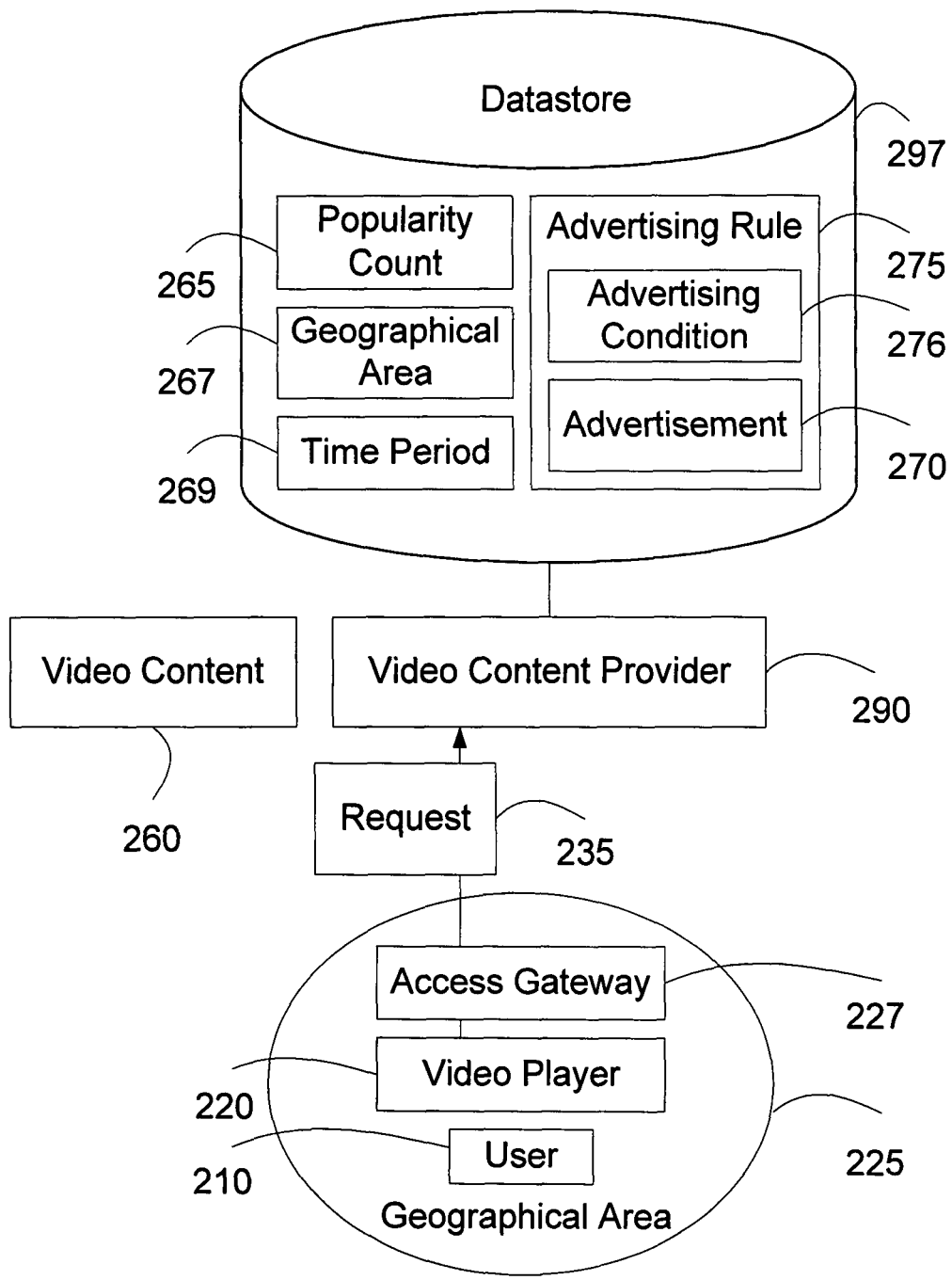
FIG. 2a illustrates a process for selecting an advertisement based on popularity count of video content and geographic area of video player.

FIG. 2a illustrates a process for selecting an advertisement based on popularity count of video content and geographic area of video player.

Video content provider 290 receives a request 235 from video player 220 via access gateway 227 for video content 260.

Video content provider 290 determines advertisement 270 based on popularity count 265 of video content 260, and geographical area 225 of video player 220.

In one embodiment, video content provider 290 connects to a datastore 297.

Datastore 297 stores a plurality of popularity counts, including popularity count 265. In one embodiment, datastore 297 includes flash memory or a hard disk. In one embodiment, datastore 297 includes a database.

In one embodiment, datastore 297 stores a plurality of advertising rules, including advertising rule 275. Advertising rule 275 includes advertising condition 276 and advertisement 270 identity. Advertising condition 276 includes a required popularity count and a required geographical area. Video content provider 290 selects advertisement 270 if advertising condition 276 is satisfied. In one embodiment, advertising condition 276 is satisfied if popularity count 265 matches the required popularity count, and geographical area 225 matches the required geographical area.

In one embodiment, popularity count 265 includes a number counting the times video content 260 has previously been requested by video players located within geographic area 267.

Advertising condition 276 is satisfied if popularity count 265 is at least 1 million and geographical area 225 matches geographic area 267.

Video content provider 290 determines geographical area 225. The process to determine geographical area 225 is illustrated later in FIG. 2b.

In one example, popularity count 265 is 1,357,902; geographical area 267 is San Francisco Bay Area; and geographical area 225 is San Francisco Bay Area. Video content provider 290 determines that advertising condition 276 is satisfied; video content provider 290 selects advertisement 270.

In another embodiment, advertising condition 276 includes time period 269. Popularity count 265 includes a number counting the times video content 260 has previously been requested by video players in geographical area 267 during time period 269 from 6:00 pm to 8:00 pm. Advertising condition 276 is satisfied if popularity count 265 is at least 300,000; geographical area 225 matches geographic area 267 and time of request 235 is within time period 269.

In one example, popularity count 265 is 652,802; geographical area 267 is San Francisco Bay Area; time period 269 is from 7:00 pm to 12:00 am; geographical area 225 is San Francisco Bay Area. In one embodiment, video content provider 290 connects to a clock. Video content provider 290 determines the time of request 235 is 7:23 pm by reading the clock when video content provider 290 receives request 235. Video content provider 290 determines that advertising condition 276 is satisfied; video content provider 290 selects advertisement 270.

In one embodiment, popularity count 265 is further based on capabilities of video player 220, including display screen capabilities such as size and resolution.

In one embodiment, popularity count 265 is further based on an access network type. Examples of access network types include cellular network, broadband network, hotspot network, WiFi network, or WiMax network.

In one embodiment, popularity count 265 is further based on Internet service provider through which video players request for video content 260. Examples of Internet service provider include cable broadband service providers, DSL Internet service providers, or wireless broadband service providers.

Figure 2B:
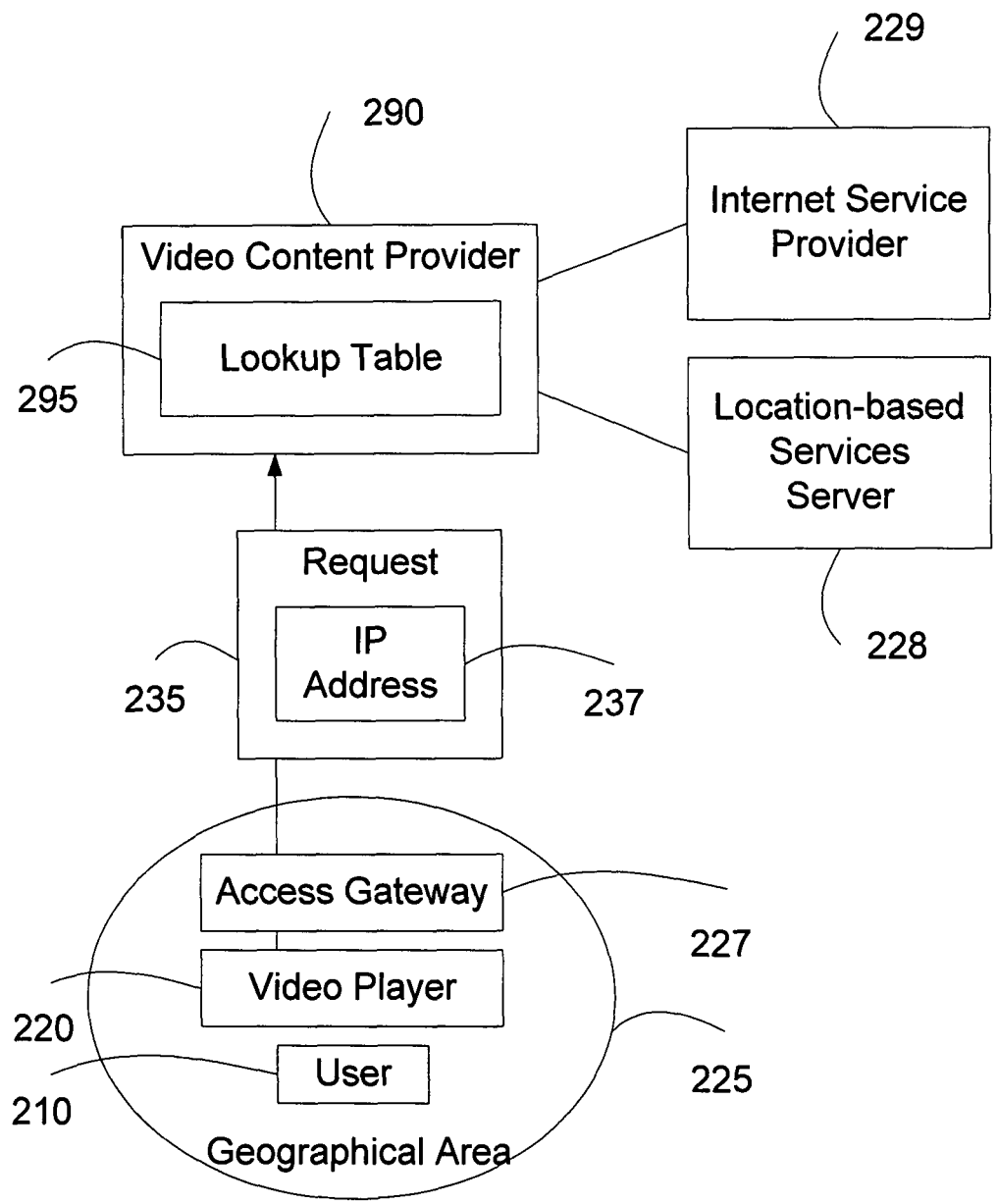
FIG. 2b illustrates a process for determining the geographical area of video player.

In the current state of the art, the video content provider 290 does not have information about the location of the video player where the request 235 comes from. This location information is associated with and known to the entity that operates the access gateway 227. FIG. 2b illustrates a process for determining the geographical area of video player based on location information about the access gateway 227.

Video content provider 290 determines geographical area 225 based on request 235 sent by video player 220 via access gateway 227.

In one embodiment, request 235 includes an Internet Protocol (IP) data packet. Video content provider 290 extract the source IP address 237 from request 235. Video content provider 290 determines geographical area 225 based on IP address 237.

In one embodiment, access gateway 227 is a BRAS. Video content provider 290 obtains a name about access gateway 227. In one embodiment, video content provider 290 uses IP address 237 to obtain the name by means of a reverse Domain Name Service (DNS) query. In one embodiment, video content provider 290 connects to a web site that provides reverse DNS lookup service, for example, web site "remote.12dt.com". In one embodiment, the name includes an identity of access gateway 227; video content provider 290 uses access gateway 227 identity to determine geographical area of access gateway 227. In one embodiment, video content provider 290 includes a lookup table 295; video content provider 290 queries lookup table 295 with the identity of access gateway 227 to obtain geographical area of access gateway 227. In one embodiment, the name includes an identity of an Internet service provider 229 that operates access gateway 227. Video content provider 290 queries Internet service provider 229 using the identity of access gateway 227 for the geographical area of access gateway 227.

Video content provider 290 determines geographical area 225 to be the geographical area of access gateway 227.

In one embodiment, access gateway 227 is a mobile access gateway such as GGSN. Video content provider 290 uses IP address 237 to obtain mobile location of video player 220. In one embodiment, video content provider 290 queries a Location-based Services (LBS) server 228 with IP address 237 using Open Mobile Alliance (OMA) Mobile Location Protocol (MLP). In one embodiment, video content provider 290 receives geographical coordinates or a longitude/latitude pair of video player 220. Video content provider 290 uses the geographical coordinates to determine geographical area 225.

In one embodiment, access gateway 227 is a wireless access point and geographical area 225 is an area covered by access gateway 227. Video content provider 290 uses IP address 237 to obtain location of access gateway 227 by querying a location server. In one embodiment, request 235 includes a TCP port number or an UDP port number. Video content provider 290 uses IP address 237 and the port number to query the location server for the location of access gateway 227. In one embodiment, the location of access gateway 227 further includes a coverage radius of access gateway 227, such as 50 feet, 150 feet or 300 feet. Video content provider 290 uses the location of access gateway 227 to determine geographical area 225.

In one embodiment, video content 160 is associated with a grouping of a plurality of video contents. Popularity count 165 is related to the grouping. In one embodiment, the grouping is based on content similarity of the plurality of video contents, such as sports, comic or history. In one example, the grouping is based on sports; the plurality of video contents includes a recorded basketball game, a documentary about the origin of the Olympic Games, and a skateboard short video. In one embodiment, the grouping is based on the length of the plurality of video contents, such as shorter than 2 minutes, 3-5 minutes, or over 20 minutes. In one embodiment, the grouping is based on language of the plurality of video contents. In one embodiment, the grouping is based on publishing era of the plurality of video contents, such as the 1960s, the 1980s, or 1971-1972. In other embodiments, the grouping is based on the director, the actors or actresses, or the producer of the plurality of video contents. In one embodiment, the grouping is based of age of users of the plurality of video contents, such as age 7-10, 13-18, or over 65. In one embodiment, the grouping is based on user opinion. In one embodiment, the grouping is based on business driven factors such as the highest bidders. In one embodiment, the grouping is based on random selections.

In one embodiment, video player 220 includes a Global Positioning System (GPS) receiver and request 235 includes geographical coordinates of video player 220 determined by the GPS receiver. Video content provider 290 uses the geographical coordinates in request 235 to determine geographical area 225.

In one embodiment, video player 220 provides time information in request 235, and video content provider 290 determines advertisement 270 based on the time information.

Foregoing described embodiments of the invention are provided as illustrations and descriptions. They are not intended to limit the invention to precise form described. In particular, it is contemplated that functional implementation of invention described herein may be implemented equivalently in hardware, software, firmware, and/or other available functional components or building blocks, and that networks may be wired, wireless, or a combination of wired and wireless. Other variations and embodiments are possible in light of above teachings, and it is thus intended that the scope of invention not be limited by this Detailed Description, but rather by Claims following.

We claim:

1. A method for selecting an advertisement for video on demand, comprising the steps of:
   (a) determining a popularity count for a non-advertisement video content comprising a number of times the non-advertisement video content has been requested by video players with given display screen capabilities while located within a given geographical area;
   (b) determining, by a video content provider, a given advertising rule of a plurality of advertising rules comprising an advertisement identity, a required popularity count associated with the given display screen capabilities, and a required geographical area;

(c) receiving by the video content provider a request for the non-advertisement video content from a mobile video player with the given display screen capabilities over a data network via an access gateway;

(d) in response to receiving the request, determining by the video content provider that the given advertising rule applies to the request, comprising:

(d1) determining a geographical area of the mobile video player based on a mobile location of the mobile video player, wherein the mobile location is a location of the access gateway determined from a dynamic access gateway address; and (d2) determining that the geographical area of the mobile video player matches the required geographical area in the given advertising rule and that the popularity count for the non-advertisement video content matches the required popularity count;

(e) in response to determining that the given advertising rule applies to the request, selecting by the video content provider an advertisement identified in the given advertising rule;

(f) after selecting the advertisement identified in the given advertising rule, combining by the video content provider the non-advertisement video content and the selected advertisement into a combined video content; and (g) delivering by the video content provider the combined video content to the mobile video player.

2. The method of claim 1, wherein the given advertising rule further comprises a time period, wherein the determining (d) further comprises:

(d4) determining that a time of the request is within the time period.

3. The method of claim 1, wherein the determines (d1) comprise:

(d1i) determines the location of the access gateway based on a source address in the request as the dynamic access gateway address.

4. The method of claim 1, wherein the popularity count is further associated with an access network type.

5. The method of claim 1, wherein the popularity count is further associated with an Internet service provider through which the mobile video player requests the non-advertisement video content.

6. The method of claim 1, wherein the geographical area comprises one or more of the following:
a country;
a state within the country; and
a city.

7. The method of claim 1, wherein the geographical area comprises one or more of the following:
a city district;
a shopping area;
a street block; and
a store.

8. The method of claim 1, wherein the display screen capabilities of the mobile video player comprises at least one of a display screen size and a display screen resolution.

9. A system, comprising:
a display screen; and
a video content provider for:
determining a popularity count for a non-advertisement video content comprising a number of times the non-advertisement video content has been requested by video players with given display screen capabilities while located within a given geographical area;
determining a given advertising rule of a plurality of advertising rules comprising an advertisement identity, a required popularity count associated with the given display screen capabilities, and a required geographical area;
receiving a request for the non-advertisement video content from a mobile video player with the given display screen capabilities over a data network via an access gateway;
in response to receiving the request, determining that the given advertising rule applies to the request, comprising:
determining a geographical area of the mobile video player based on a mobile location of the mobile video player, wherein the mobile location is a location of the access gateway determined from a dynamic access gateway address; and
determining that the geographical area of the mobile video player matches the required geographical area in the given advertising rule and that the popularity count for the non-advertisement video content matches the required popularity count;
in response to determining that the given advertising rule applies to the request, selecting an advertisement identified in the given advertising rule;
after selecting the advertisement identified in the given advertising rule, combining the non-advertisement video content and the selected advertisement into a combined video content; and
delivering the combined video content to the mobile video player.

10. The system of claim 9, wherein the given advertising rule further comprises a time period, wherein in determining that the given advertising rule applies to the request, the video content provider further:
determines that a time of the request is within the time period.

11. The system of claim 9, wherein the video content provider determines the location of the access gateway based on a source address in the request as the dynamic access gateway address.

12. The system of claim 9, wherein the popularity count is further associated with an access network type.

13. The system of claim 9, wherein the popularity count is further associated with an Internet service provider through which the mobile video player requests the non-advertisement video content.

14. The system of claim 9, wherein the geographical area comprises one or more of the following:
a country;
a state within the country; and
a city.

15. The system of claim 9, wherein the geographical area comprises one or more of the following:
a city district;
a shopping area;
a street block; and
a store.

16. A method for selecting an advertisement for video on demand, comprising the steps of:

(a) determining a popularity count for a non-advertisement video content comprising a number of times the non-advertisement video content has been requested by video players with given display screen capabilities while located within a given geographical area;

(b) determining, by a video content provider, a given advertising rule of a plurality of advertising rules comprising an advertisement identity, a required popularity count associated with the given display screen capabilities, and a required geographical area;

(c) receiving by the video content provider a request for the non-advertisement video content from a mobile video player with the given display screen capabilities over a data network via an access gateway;

(d) in response to receiving the request, determining by the video content provider that the given advertising rule applies to the request, comprising:

(d1) determining a geographical area of the mobile video player based on a mobile location of the mobile video player, wherein the mobile video player comprises a global positioning system (GPS) receiver, wherein the mobile comprises geographical coordinates of the mobile video player determined by the GPS receiver; and (d2) determining that the geographical area of the mobile video player matches the required geographical area in the given advertising rule and that the popularity count for the non-advertisement video content matches the required popularity count;

(e) in response to determining that the given advertising rule applies to the request, selecting by the video content provider an advertisement identified in the given advertising rule;

(f) after selecting the advertisement identified in the given advertising rule, combining by the video content provider the non-advertisement video content and the selected advertisement into a combined video content; and (g) delivering by the video content provider the combined video content to the mobile video player.

17. A system, comprising:

a display screen; and a video content provider for:

determining a popularity count for a non-advertisement video content comprising a number of times the non-advertisement video content has been requested by video players with given display screen capabilities while located within a given geographical area;

determining a given advertising rule of a plurality of advertising rules comprising an advertisement identity, a required popularity count associated with the given display screen capabilities, and a required geographical area;

receiving a request for the non-advertisement video content from a mobile video player with the given display screen capabilities over a data network via an access gateway;

in response to receiving the request, determining that the given advertising rule applies to the request, comprising:

determining a geographical area of the mobile video player based on a mobile location of the mobile video player, wherein the mobile video player comprises a global positioning system (GPS) receiver, wherein the mobile comprises geographical coordinates of the mobile video player determined by the GPS receiver; and determining that the geographical area of the mobile video player matches the required geographical area in the given advertising rule and that the popularity count for the non-advertisement video content matches the required popularity count;

in response to determining that the given advertising rule applies to the request, selecting an advertisement identified in the given advertising rule;

after selecting the advertisement identified in the given advertising rule, combining the non-advertisement video content and the selected advertisement into a combined video content; and delivering the combined video content to the mobile video player.

* * * * *